(12) United States Patent
Ai et al.

(10) Patent No.: US 8,654,757 B2
(45) Date of Patent: Feb. 18, 2014

(54) METHOD AND APPARATUS OF SYNCHRONIZATION SCHEDULING

(75) Inventors: Jianxun Ai, Shenzhen (CN); Hengxing Zhai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 391 days.

(21) Appl. No.: 13/128,918

(22) PCT Filed: Mar. 31, 2009

(86) PCT No.: PCT/CN2009/071114
§ 371 (c)(1),
(2), (4) Date: May 12, 2011

(87) PCT Pub. No.: WO2010/054541
PCT Pub. Date: May 20, 2010

(65) Prior Publication Data
US 2011/0216787 A1    Sep. 8, 2011

(30) Foreign Application Priority Data

Nov. 12, 2008   (CN) .......................... 2008 1 0177726

(51) Int. Cl.
*H04J 3/06*   (2006.01)
(52) U.S. Cl.
USPC .......................................... 370/350; 370/503
(58) Field of Classification Search
None
See application file for complete search history.

(56) References Cited

U.S. PATENT DOCUMENTS

| 5,909,447 | A * | 6/1999 | Cox et al. ...................... 370/508 |
| 6,654,375 | B1 * | 11/2003 | Vedder .......................... 370/394 |
| 8,213,348 | B2 * | 7/2012 | Ai ................................. 370/312 |
| 2006/0146745 | A1 * | 7/2006 | Cai et al. ....................... 370/328 |

FOREIGN PATENT DOCUMENTS

| CN | 1852265 A | 10/2006 |
| CN | 101039175 A | 9/2007 |
| CN | 101043265 A | 9/2007 |
| CN | 101123611 A | 2/2008 |

OTHER PUBLICATIONS

International Search Report and Written Opinion for PCT/CN2009/071114 mailed Aug. 6, 2009.
International Preliminary Report on Patentability for PCT/CN2009/071114 mailed May 26, 2011.
English Abstract of CN 101043265.
English Abstract of CN 1852265.
English Abstract of CN 101123611.
English Abstract of CN 101039175.

\* cited by examiner

*Primary Examiner* — Hassan Phillips
*Assistant Examiner* — Hicham Foud
(74) *Attorney, Agent, or Firm* — Brian J. Colandreo; Jeffrey T. Placker; Holland & Knight LLP (57) ABSTRACT

A method and an apparatus for synchronization scheduling are provided. In the method, service data are processed according to the scheduling transmission time interval determined according to the time division multiplexing period and the synchronization sequence length of the service, the method may avoid the situation of non-uniform resource allocation, which is incurred by inconsecutive distribution of wireless interface resources under the TDM configuration, and thus avoid the overflow of the synchronization sequences of the service and the loss of service data.

20 Claims, 6 Drawing Sheets

METHOD AND APPARATUS OF SYNCHRONIZATION SCHEDULING

RELATED APPLICATIONS

The subject application is a U.S. National Stage application of International Application No. PCT/CN2009/071114, filed on 31 Mar. 2009, which claims the priority of Chinese Patent Application No.: 200810177726.7, filed on 12 Nov. 2008, the contents of which are herein incorporated by reference in its entirety.

TECHNICAL FIELD

The present invention relates to the field of communication, and especially, to a method and an apparatus for synchronization scheduling.

BACKGROUND ART

With the development of the Internet network, huge multimedia services take emergence, and people's needs on mobile communication are not limited to telephone and message services any more. Currently, application services are introduced into the multimedia services and have a feature that multiple users can receive the same data at the same time, for example, video on demand, television broadcast, video conference, online education, interactive game, etc.

An MBMS (Multimedia Broadcast Multicast Service) technology is put forward to use resources of a mobile network effectively. The MBMS is a point-to-multipoint service that one data source transmits data to multiple users, and network resources can be shared through this service, including sharing resources of a mobile core network and an access network, especially sharing air interface resources, moreover, the MBMS in 3GPP can realize not only multicast and broadcast of message-type services of pure-text and low-rate, but also multicast and broadcast of multimedia services of high-rate.

Figure 1:
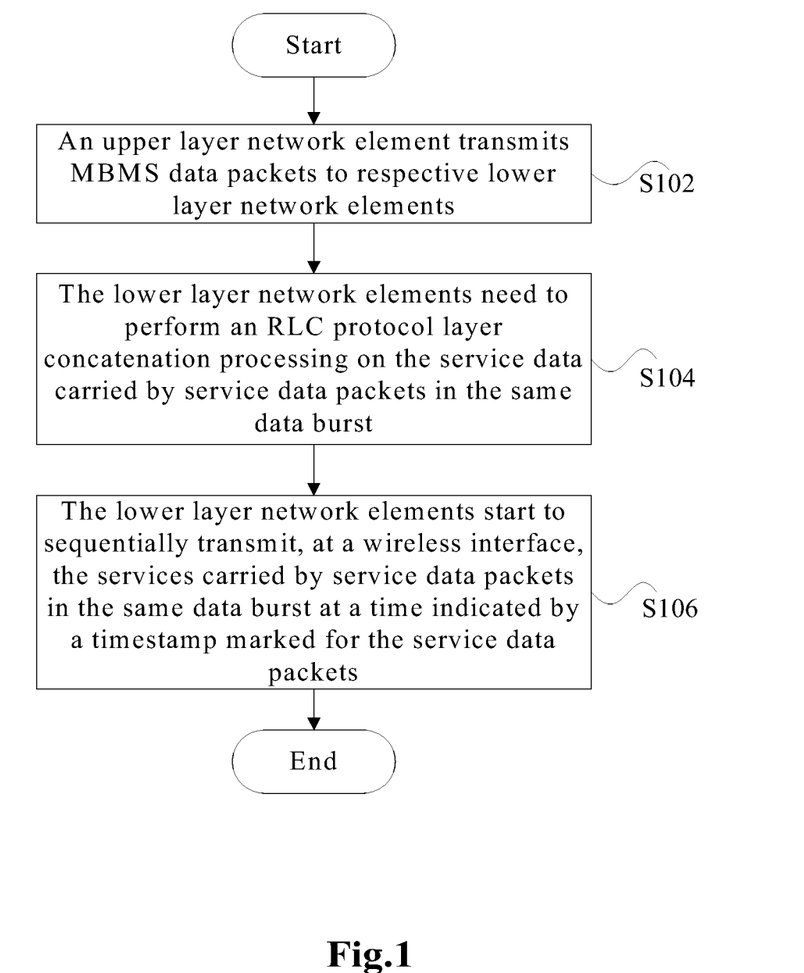
FIG. 1 is a flow chart of a method for synchronization processing of an MBMS service of multiple network elements in the prior art.

Since the MBMS service is a service directed to the whole network, a same MBMS service may be established at different lower layer network element nodes. FIG. 1 is a flow chart of a method for synchronization processing of a MBMS service of multiple network elements in the prior art, which comprises the following processing.

Step S102, an upper layer network element transmits MBMS service data packet(s) to respective lower layer network elements, and the service data packet(s) bears service data and carries timestamp information, data packet sequence number information, accumulated service data length information, etc. The upper layer network element marks one or more consecutive service data packets with same timestamp information, and the data packets marked with the same timestamp make up of a data burst or are referred to as a synchronization sequence. Specially, the upper layer network element marks each service data packet as one data burst or synchronization sequence, and here each data burst or synchronization sequence only includes one service data packet.

Step S104, the lower layer network elements need to perform an RLC (Radio Link Control) protocol layer concatenation processing on the service data carried by the service data packet(s) in a same data burst, and the RLC concatenation processing will not be performed on the service data packet(s) of different synchronization sequences. Moreover, while performing the RLC protocol layer processing on the data packet(s) of one synchronization sequence, a reset processing is performed, starting from the first data packet of each synchronization sequence, on an RLC sequence number of an RLC protocol layer. That is to say, starting from the first RLC PDU (Protocol Data Unit) of the first data packet of each synchronization sequence, the RLC sequence number is assigned from a certain agreed or configured fixed value. The advantage of such performance is as follows: when it occurs that multiple consecutive data packets are lost during a transmission process from the upper layer network element to the lower layer network element, the lower layer network element cannot determine according to the prior art the length of the RLC PDU occupied by the lost data packets during the performance of the RLC processing, which results in that the network element which loses packets cannot keep consistency in subsequent RLC processing with the other network elements, while this problem can be avoided by resetting the RLC sequence number at the beginning of each synchronization sequence, and this can ensure that the RLC sequence numbers of respective network elements are consistent with one another at the beginning of each synchronization sequence.

S106, for service data carried by service data packets marked by the timestamp in the same synchronization sequence, the lower layer network elements sequentially transmit, at wireless interfaces, the service data packets from a transmitting time point corresponding to the timestamp, since the above information transmitted by the upper layer network element to the respective lower layer network elements is completely consistent with each other, the respective lower layer network elements can perform completely consistent processing, thereby realizing synchronously transmitting of the MBMS service among cells of the respective lower layer network elements.

Currently, the timestamp information of each data packet can be set in the following two manners.

Manner 1: the upper layer network element marks a timestamp according to the time when it receives the service data packets, and service data packets received within a time interval with a specific length are marked with the same timestamp, wherein the time interval with the specific length is called as a synchronization sequence length, or a scheduling period.

Manner 2: the upper layer network element virtualizes the RLC protocol layer processing of the lower layer network elements, and marks the service data packets on which the RLC concatenation processing should be performed with the same timestamp according to the result of the virtualized RLC processing.

In the above two setting manners, as the timestamp information depends on the time when the service data packets arrive at the upper layer network element, the timestamp intervals of the service data packets cannot be determined. Suppose the service data flow received by the upper layer network element is a data flow shaped according to a service QoS, that is, within a random period of time, the bandwidth of the service data flow does not exceed a maximum bandwidth defined by a service QoS parameter, and suppose the channel resources of the wireless interface within the period of time matches the QoS parameter.

One MBMS service can be transmitted at wireless interfaces in a TDM (Time Division Multiplexing) manner, and the TDM configuration comprises the following parameters: a TDM period, a TDM offset and a TDM repeat length. Available TDM resources of one service can be represented as follows: (a system frame number CFN dividing exactly the number of 10 ms radio frames included in a TTI (Transmission Time Interval)) modular operation (TDM period)=TDM offset+i, i=0, 1, . . . , (TDM period−1). Specifically, one MBMS service is transmitted, within a TDM period it is allocated, from the (TDM offset)$^{th}$ TTI and within consecutive scheduling TTIs (transmission time interval) in a number of TDM repeat length, wherein the TDM repeat period is no more than 9, and the length of the TTI that can be used by the MBMS service is 40 or 80 ms. One service can only be transmitted at the wireless interface within a configured available transmission time in the TDM period.

Figure 2:
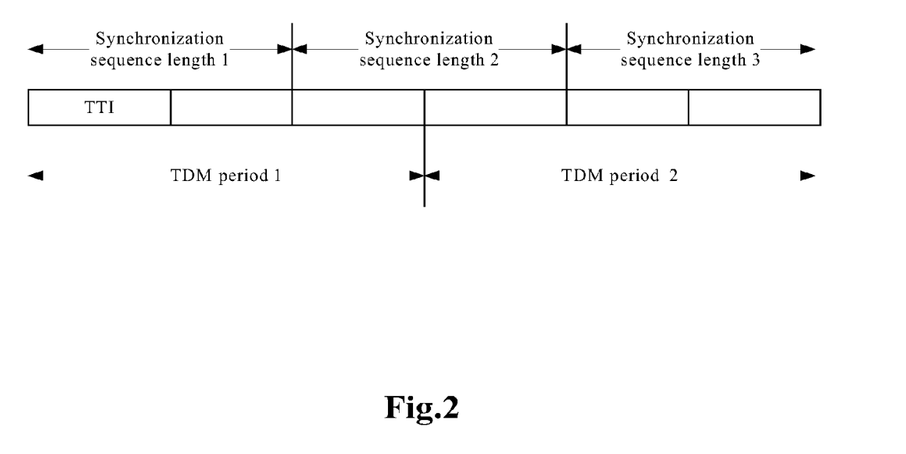
FIG. 2 is a schematic view of an example in the prior art that the synchronization sequence length does not match with the TDM period.

When data are transmitted in manner of TDM, as the transmission time of one MBMS service at the wireless interface is not consecutive, but appears periodically and circularly according to the configuration of the TDM, due to current scheduling methods, the timestamp is uncertain, and thus the timestamp information may not directly correspond to a start time when the MBMS service can be transmitted at the wireless interface. That is, the timestamp and the transmission opportunities (available transmission time) of the wireless interface cannot correspond to each other one by one, for example, as shown in FIG. 2, the synchronization sequence length does not match the TDM period.

Figure 3:
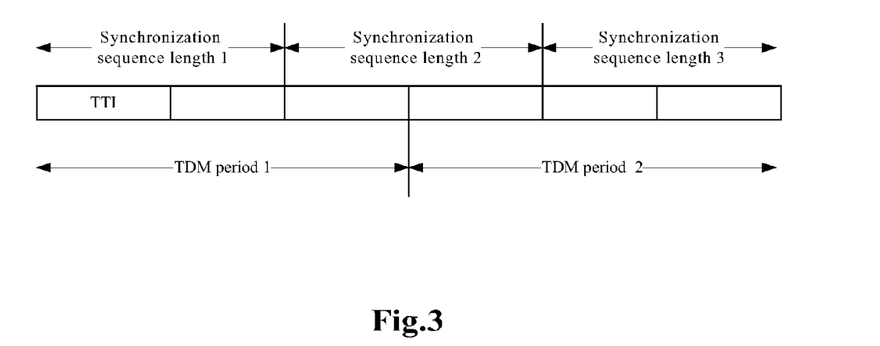
FIG. 3 is a schematic view of an example of inconsistent allocation of resources corresponding to different synchronization sequence lengths in the prior art.

FIG. 3 is a schematic view of inconsistent allocation of resources corresponding to different synchronization sequence lengths. As shown in FIG. 3, in the TDM configuration manner, as its wireless channel resources are not consecutive, within the same period at different positions, available wireless resources are different, and in this situation, the scheduling algorithms in the prior art will result in an error result. The scheduling algorithms in the prior art suppose that service data packets that can be transmitted in a certain period may not be able to be transmitted at the wireless interface and then a situation of overflow appears, which will result in loss of service data and reduce service receipt quality seriously.

SUMMARY OF THE INVENTION

The present invention is provided considering the problem in the prior art that the current scheduling methods result in loss of service data and seriously reduce the service receipt quality. Therefore, the present invention mainly aims at providing an improved synchronization scheduling solution to solve the above problem.

To achieve the above purpose, according to one aspect of the present invention, a method for synchronization scheduling is provided.

The method for synchronization scheduling according to the present invention comprises: lower layer network element (s) obtaining multiple synchronization sequences of a designated service from an upper layer network element to which the lower layer network element(s) belongs, wherein the upper layer network element processes data packets of the designated service according to a synchronization sequence length, and transmits the multiple synchronization sequences to the lower layer network element(s), wherein the synchronization sequences are a set of data packets with the same timestamp information; the lower layer network element(s) determining a scheduling transmission time interval according to the synchronization sequence length and a time division multiplexing period of the designated service, wherein the scheduling transmission time interval is a common multiple of the time division multiplexing period and the synchronization sequence length, and the time division multiplexing period of the designated service is 1/n time of the period of a wireless interface connection frame number, n is an integer; and as for a synchronization sequence whose timestamp locates in a current scheduling transmission time interval, the lower layer network element(s) transmitting it in an available transmission period of a designated scheduling transmission time interval.

According to another aspect of the present invention, an apparatus for synchronization processing is provided, and is located at the lower layer network element side.

The apparatus for synchronization scheduling according to the present invention comprises: obtaining means, configured to obtain multiple synchronization sequences of a designated service from an upper layer network element to which a lower layer network element belongs, wherein the upper layer network element processes data packets of the designated service according to a synchronization sequence length, and transmits the multiple synchronization sequences to the lower layer network element, wherein each synchronization sequence is a set of data packets with the same timestamp information; determining means, configured to determine a scheduling transmission time interval according to the synchronization sequence length and a time division multiplexing period of the designated service, wherein the scheduling transmission time interval is a common multiple of the time division multiplexing period and the synchronization sequence length, and the time division multiplexing period of the designated service is 1/n time of the period of a wireless interface connection frame number, n is an integer; and transmitting means, configured to transmit a synchronization sequence whose timestamp locates in a current scheduling transmission time interval in an available transmission period of the time division multiplexing period of a designated scheduling transmission time interval, wherein the designated scheduling transmission time interval comprises one of the current scheduling transmission time interval and the next scheduling transmission time interval.

With the method provided by the present invention, service data are processed according to the scheduling transmission time interval determined according to the time division multiplexing period and the synchronization sequence length of the service, compared with the prior art, the present invention can avoid the situation of non-uniform resource allocation, which is incurred by inconsecutive distribution of wireless interface resources under the TDM configuration, and thus avoid the overflow of the synchronization sequences of the service and the loss of service data.

BRIEF DESCRIPTION OF ACCOMPANYING DRAWINGS

The accompanying drawings are used to provide further understanding of the present invention and constitute a part of the specification, and they are used to explain the present invention together with the embodiments of the present invention and do not constitute restrictions on the present invention. In the accompanying drawings.

DETAILED DESCRIPTION OF EMBODIMENTS

Functional Overview

The basic idea of the present invention is as follows: in the current TDM configuration manner, as wireless channel resources are not consecutive, available wireless resources are different within the same time period at different time points, in this situation, the scheduling algorithms in the prior art will result in an error result, and in view of this the present invention provides a method for synchronization scheduling, to solve this problem by setting a scheduling transmission time interval which is a common multiple of a time division multiplexing period and a synchronization sequence length and then transmitting a received synchronization sequence within the designated scheduling transmission time interval.

The present invention will be detailed hereinafter in combination with the accompanying drawings. It needs to be explained that the embodiments of the present invention and the features of the embodiments can be combined with one another in the case of no conflict.

Method Embodiment

According to the embodiment of the present invention, a method for synchronization scheduling is provided.

It needs to be explained that, for the convenience of description, the technical solution of the method embodiment of the present invention is shown and described hereinafter by means of steps which can be executed in a computer system, such as a group of computer executable instructions. Although the logical order of the steps has been shown in related drawings, in some situations the steps as shown or described herein can be executed in an order different from the order herein.

Figure 4:
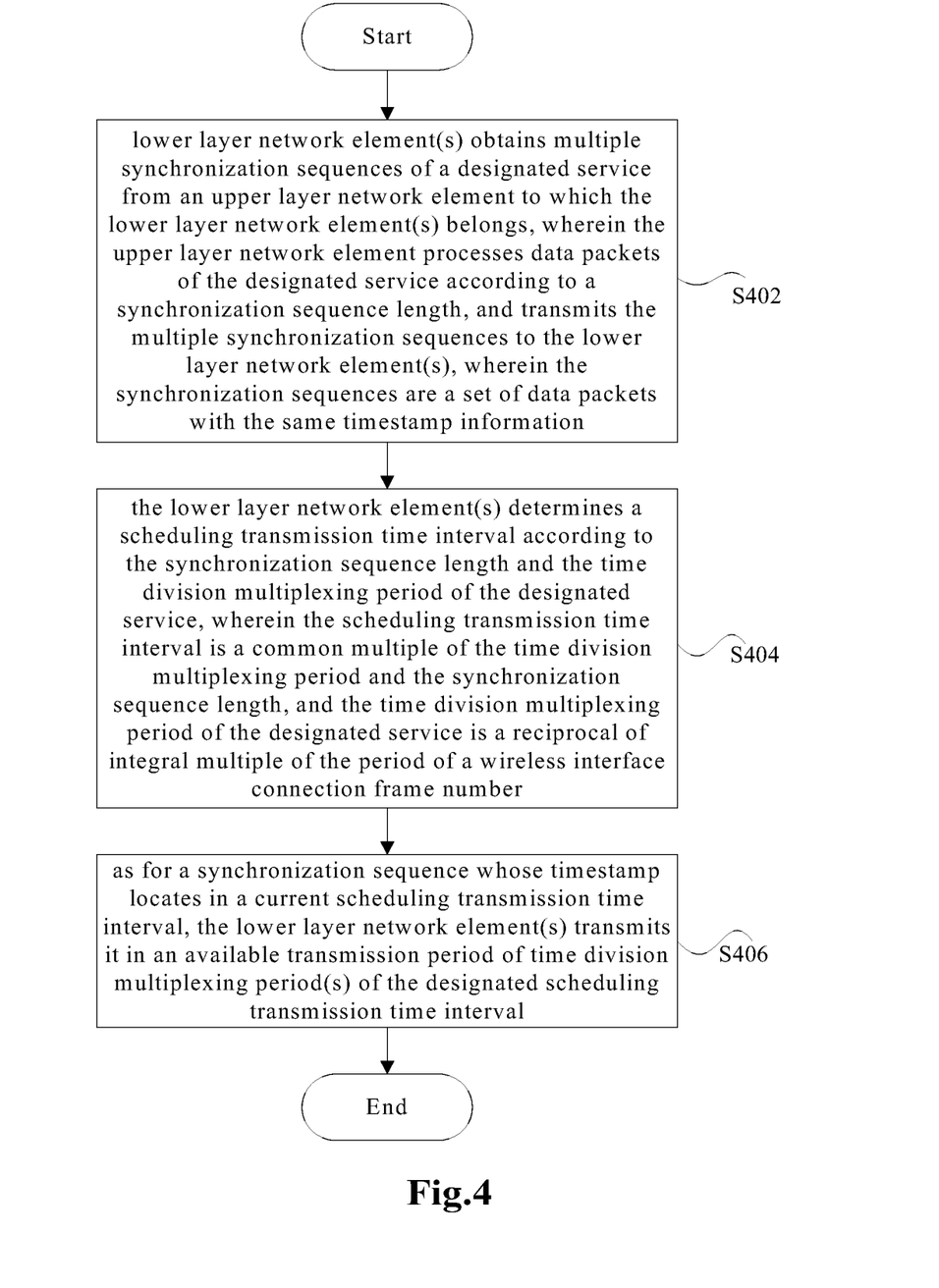
FIG. 4 is a flow chart of the method for synchronization scheduling according to the method embodiment of the present invention.

FIG. 4 is a flow chart of the method for synchronization scheduling according to the embodiment of the present invention, and as shown in FIG. 4, the method comprises the following steps (steps S402 to S406):

step S402, lower layer network element(s) obtains multiple synchronization sequences of a designated service from an upper layer network element to which the lower layer network element(s) belongs, wherein the upper layer network element processes data packets of the designated service according to a synchronization sequence length, and transmits the multiple synchronization sequences to the lower layer network element(s), wherein the synchronization sequences are a set of data packets with the same timestamp information;

step S404, the lower layer network element(s) determines a scheduling transmission time interval according to the synchronization sequence length and the time division multiplexing period of the designated service, wherein the scheduling transmission time interval is a common multiple of the time division multiplexing period and the synchronization sequence length, and the time division multiplexing period of the designated service is 1/n time of the period of a wireless interface connection frame number, n is an integer; and step S406, as for a synchronization sequence whose timestamp locates in a current scheduling transmission time interval, the lower layer network element(s) transmits it in an available transmission period of time division multiplexing period(s) of the designated scheduling transmission time interval. In the above, the designated scheduling transmission time interval comprises one of the current scheduling transmission time interval and the next scheduling transmission time interval; the available transmission period is a period of time of the wireless interface resources which is used for transmitting the data packets; and the timestamp information corresponding to a first synchronization sequence obtained by the lower layer network element(s) can be determined as a start time of the first scheduling transmission time interval.

In step S402, after the lower layer network element(s) obtains the multiple synchronization sequences of the designated service, the lower layer network element(s) can perform an RLC concatenation processing on the data packets of the synchronization sequence(s) whose timestamp locates in the synchronization sequence length of the current scheduling transmission time interval.

In step S404, the lower layer network element(s) needs to obtain the synchronization sequence length of the upper layer network element in advance. In the above, the synchronization sequence length can be obtained in the following two ways: first, the lower layer network element(s) obtains the synchronization sequence length according to a system configuration; and second, the upper layer network element notifies the lower layer network element(s) of the synchronization sequence length.

In addition, when the first data packet of the first synchronization sequence is received within each scheduling transmission time interval, the lower layer network element(s) needs to reset an RLC sequence number of the designated service.

To avoid that the length of the TDM period is not 1/n (n is an integer) time of a system frame number CFN period, which then results in the non-uniform distribution of wireless resources in a transmission scheduling period in the method, the lower layer network element(s) needs to set the TDM period of the service to be 1/n (n is an integer) time of the CFN period. As the value of the time division multiplexing period (TDM period) of the current MBMS service is one of 2 to 9, that is, a length of 2 TTIs to 9 TTIs, and the value of a wireless interface connection frame number (CFN) is 256 of 10 ms, suppose that the length of one TTI is 4 of 10 ms, then one CFN period comprises 64 TTIs, considering that the value range of the TDM period, if the number of the TTIs contained in one TDM period is not 1/n (n is an integer) time of 1024, then the number of TDM periods contained in one CFN period is not an integer, that is to say, a situation may appear that there is only part of one TDM period at the tail of one CFN period, which thus results in that resources which can be used by the service in the duration of this part of the period is inconsistent with that in the other periods. In the embodiment of the present invention, the upper layer network element supposes that the distribution of the wireless interface resources allocated by the lower layer network element(s) is uniform, while the supposition is not tenable if the TDM period is not 1/n (n is an integer) time of the length of the CFN period.

With the technical solution provided by the embodiment of the present invention, service data are processed according to the scheduling transmission time interval determined according to the time division multiplexing period and the synchronization sequence length of the service. Compared with the prior art, the present invention can avoid the situation of non-uniform resource allocation which is incurred by inconsecutive distribution of wireless interface resources under the TDM configuration, and thus avoid the overflow of the synchronization sequences of the service and the loss of service data.

Before further describing the embodiments of the present invention, the upper layer network element and the lower layer network element will be described.

The upper layer network element is configured to fulfill the scheduling of the received MBMS service data packets, and specifically, the upper layer network element marks each service data packet with timestamp information, service data packets marked with the same timestamp information is called a synchronization sequence, and then the data packets marked with the timestamp information are transmitted to one or more lower layer network elements belonging to the upper layer network element.

The lower layer network element is configured to receive the service data packets transmitted from the upper layer network element and calculate a start time to transmit one synchronization sequence according to the timestamp information of each service data packet. During RLC protocol layer processing, the lower layer network element performs the RLC concatenation processing on the data packets of the same synchronization sequence and transmits the service data packets subjected to a radio network layer user plane protocol processing at the wireless interface. To improve synchronization recovery in the situation of packet loss at the wireless interface, the lower layer network element performs RLC reset at the beginning of each synchronization sequence and starts to reallocate RLC protocol layer sequences.

Figure 5:
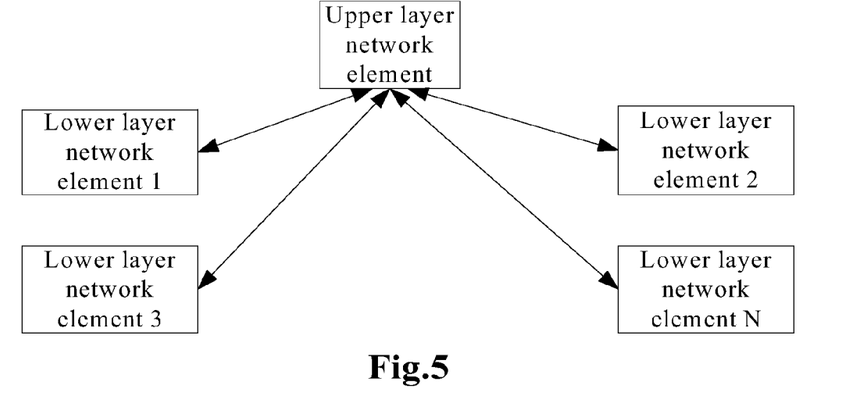
FIG. 5 is a frame diagram of the logical structure of the upper layer network element and the lower layer network elements according to the present invention.

FIG. 5 is a frame diagram of the logical structure of the upper layer network element and the lower layer network elements, and as shown in FIG. 5, one upper layer network element is connected with multiple lower layer network elements and performs signaling interaction with the same. It needs to be explained that one upper layer network element and one or more lower layer network elements belonging to the upper layer network element can be identical network elements or different network elements in physical functions. To cooperatively complete the function of service synchronization, it is just a logical division to divide them to an upper layer network element and lower layer network elements, that is, several identical or different physical network elements are divided into one upper layer network element and several lower layer network elements according to logical functions, and such network elements cooperate with one another and realize the MBMS service transmitted in a multi-cell combination manner among cells of the lower layer network elements.

In the above, the upper layer network element and the lower layer network elements can be, but not limited to, the following combinations of network elements.

Combination 1: in an MBMS service synchronization networking of a UMTS Terrestrial Radio Access Network (UTRAN) system, the upper layer network element is an upper RNC (Radio Network Controller), and the lower layer network element is a lower RNC, wherein the interface between the upper layer network element and the lower layer network element is an Iur interface, and in this combination, the upper layer network element and the lower layer network element are network elements having the same physical functions.

Combination 2: in an MBMS service synchronization networking of an enhanced High Speed Packet Access (HSPA+) system, the upper layer network element is a GGSN, SGSN or BMSC, and the lower layer network element is an RNC or a node plus (NB+).

Combination 3: in an MBMS service synchronization networking of an LTE (Long-Term Evolution) system, the upper layer network element is an MGW (MBMS Gateway) or an MCE (Multi-cell/multicast Coordination Entity), and the lower layer network element is an evolved Node B (E-UTRAN Node B).

Based on the above technology, the present invention provides a synchronization method to realize synchronous transmission, among multiple network elements, of services for which wireless interface resources is configured in the TDM manner.

EXAMPLES

The upper layer network element can schedule the data packets and set the timestamp information of each data packet in the following way: the upper layer network element marks a timestamp according to the time when it receives a service data packet and marks the service data packets received within a time interval of specific length with the same timestamp, wherein the time interval of specific length is called a synchronization sequence length or a scheduling period.

For the synchronization sequences of a designated service transmitted from the upper layer network element, the lower layer network element(s) can calculate a scheduling transmission time interval according to a TDM period length configured by the designated service and the synchronization sequence length information of the upper layer network element, and the length of the scheduling transmission time interval is a common multiple of the TDM period length and the synchronization sequence length of the upper layer network element, wherein the methods for the lower layer network element(s) to obtain the scheduling information of the upper layer network element are as follows:

Method 1: through management configuration, the lower layer network element(s) obtain the synchronization sequence length configured by the upper layer network element for the designated service; and Method 2: by transmitting a signaling message to the lower layer network element(s), the upper layer network element notifies the lower layer network element(s) of the synchronization sequence length of the designated service.

During practical implementation, for one or more synchronization sequences whose timestamp locates in one scheduling transmission time interval, the lower layer network element(s), from the start time of the next or the current scheduling transmission time interval, start to sequentially transmit the data packets of one or more synchronization sequences in available wireless resources corresponding to the next or the current scheduling transmission time interval.

When starting to transmit the first data packet of the service in the wireless resources corresponding to one scheduling transmission time interval, firstly, the lower layer network element(s) reset the next RLC sequence number of the service, and then perform the RLC concatenation processing on the data packets of one or more synchronization sequences transmitted in the same scheduling transmission time interval.

Meanwhile, the TDM period of the service is set to be 1/n (n is an integer) time of the CFN period, which ensures that the number of the TDM periods allocated for the service is an integral value in one CFN period.

Figure 6:
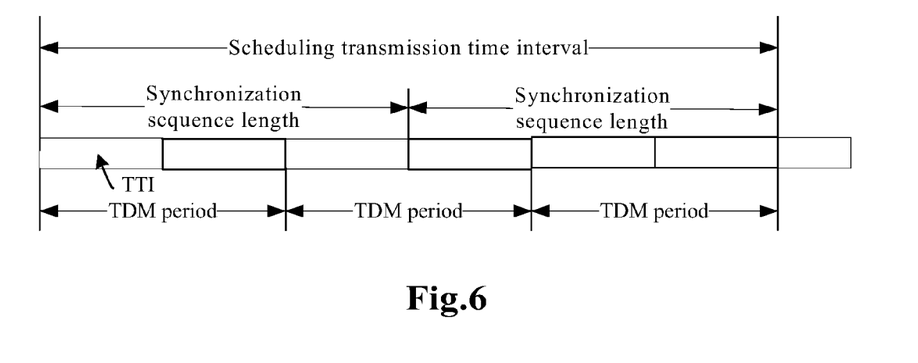
FIG. 6 is a schematic view 1 of the relationship among the TDM period, the synchronization sequence length and the scheduling transmission time interval according to the present invention.

For example, FIG. 6 is a schematic view of the relationship among the TDM period, the synchronization sequence length and the scheduling transmission time interval according to the present invention, and as shown in FIG. 6, the TDM period of the service is 2 TTIs, the synchronization sequence length of the service is 3 TTIs, and according to the TDM period and the synchronization sequence length, the scheduling transmission time interval of the service can be a common multiple of 2 and 3 from calculation. Preferably, their minimum common multiple 6 can be selected, and then the scheduling transmission time interval of the service is 6 TTIs. During mapping procedure, service data packets received within the current 6 TTIs can be transmitted within an available transmission period of the TDM period of the current 6 TTIs, or can also be transmitted within an available transmission period of the TDM period of the next 6 TTIs.

Figure 7:
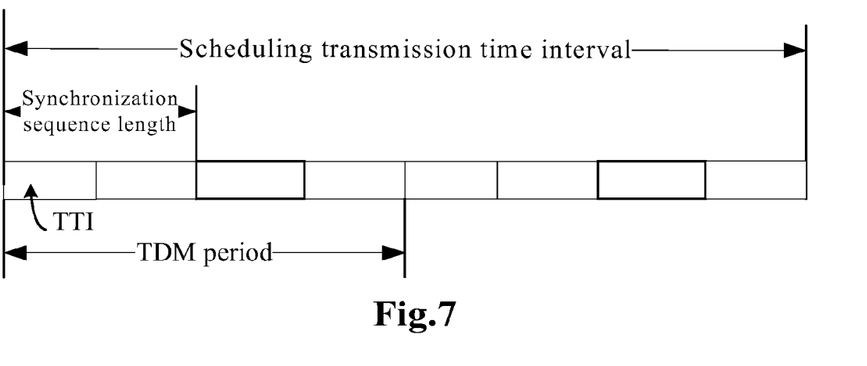
FIG. 7 is a schematic view 2 of the relationship among the TDM period, the synchronization sequence length and the scheduling transmission time interval according to the present invention.

For example, FIG. 7 is a schematic view of the relationship among the TDM period, the synchronization sequence length and the scheduling transmission time interval according to the present invention, and as shown in FIG. 7, the TDM period of the service is 4 TTIs, the synchronization sequence length of the service is 2 TTIs, and according to the TDM period and the synchronization sequence length, the scheduling transmission time interval of the service can be a common multiple of 4 and 2 from calculation. Preferably, their minimum common multiple 8 can be selected, and then the scheduling transmission time interval of the service is 8 TTIs. During mapping procedure, service data packets received within the current 8 TTIs can be transmitted within an available transmission period of the TDM period of the current 8 TTIs, or can also be transmitted within an available transmission period of the TDM period of the next 8 TTIs.

Apparatus Embodiment

According to an embodiment of the present invention, an apparatus for synchronization scheduling is provided to preferably achieve the above method provided by the above method embodiment.

Figure 8:
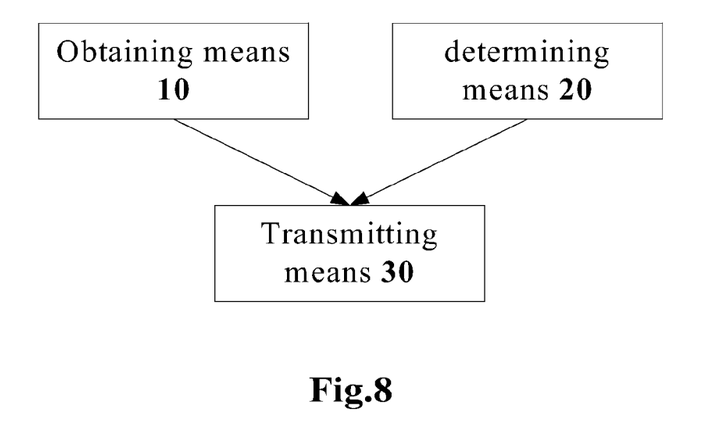
FIG. 8 is a block diagram of the structure of the apparatus for synchronization scheduling according to the apparatus embodiment of the present invention.

FIG. 8 is a block diagram of the structure of the apparatus for synchronization scheduling according to the embodiment of the present invention, and the apparatus is located at the lower layer network element side, as shown in FIG. 8, the apparatus comprises obtaining means 10, determining means 20 and transmitting means 30, which will be detailed hereinafter.

The obtaining means 10 is configured to obtain multiple synchronization sequences of a designated service from an upper layer network element to which a lower layer network element belongs, wherein, the upper layer network element processes data packets of the designated service according to a synchronization sequence length, and transmits the multiple synchronization sequences to the lower layer network element, herein each synchronization sequence is a set of data packets with the same timestamp information; the determining means 20 is connected to the obtaining means 10 and configured to determine a scheduling transmission time interval according to the synchronization sequence length and the time division multiplexing period of the designated service, wherein the scheduling transmission time interval is a common multiple of the time division multiplexing period and the synchronization sequence length, and the time division multiplexing period of the designated service is 1/n time of the period of a wireless interface connection frame number, n is an integer; and the transmitting means 30 is connected to the obtaining means 10 and the determining means 20, and is configured to transmit a synchronization sequence whose timestamp locates in a current scheduling transmission time interval in an available transmission period of the time division multiplexing period of a designated scheduling transmission time interval, wherein the designated scheduling transmission time interval comprises one of: the current scheduling transmission time interval; and the next scheduling transmission time interval.

With the apparatus provided by the present invention, service data are processed according to the scheduling transmission time interval determined according to the time division multiplexing period and the synchronization sequence length of the service. Compared with the prior art, the present invention can avoid the situation of non-uniform resource allocation which is incurred by inconsecutive distribution of wireless interface resources under the TDM configuration, and thus avoid the overflow of the synchronization sequences of the service and the loss of service data.

As discussed above, in virtue of the method and/or apparatus for synchronization scheduling provided by the present invention, service data are processed according to the scheduling transmission time interval determined according to the time division multiplexing period and the synchronization sequence length of the service, compared with the prior art, the present invention can avoid the situation of non-uniform resource allocation which is incurred by inconsecutive distribution of wireless interface resources under the TDM configuration, and thus avoid the overflow of the synchronization sequences of the service, and avoid the discard of transmitted data since the synchronization sequences scheduled by the upper layer network element are inconsistent with the resources within a wireless interface period corresponding to the synchronization sequences.

Obviously, one skilled in the art shall understand that various means and steps described above can be realized with general computing devices and can be integrated into one single computing device or distributed within a network consisting of multiple computing devices, and alternatively, the various means and steps described above can be realized with the program codes executable by the computing devices, and thus can be stored in memory devices so as to be executed by the computing devices, or the various means and steps described above can be formed into individual integrated circuit modules, or a plurality of the means or steps can be formed into a single integrated circuit module so as to be realized. Therefore, the present invention is not limited to any particular hardware or software combination.

Described above are just preferable embodiments of the present invention and are not intended to restrict the present invention. For those skilled in the art, the present invention may have various changes and variations. Any modifications, equivalent substitutions, improvements and etc. within the spirit and principle of the present invention shall all be contained in the scope of protection of the present invention.

The invention claimed is:

1. A method for synchronization scheduling, comprising:
    obtaining, by lower layer network element(s), multiple synchronization sequences of a designated service from an upper layer network element to which the lower layer network element(s) belongs, wherein the upper layer network element processes data packets of the designated service according to a synchronization sequence length, and transmits the multiple synchronization sequences to the lower layer network element(s), wherein the synchronization sequences are a set of data packets with the same timestamp information;

determining, by the lower layer network element(s), a scheduling transmission time interval according to the synchronization sequence length and a time division multiplexing period of the designated service, wherein the scheduling transmission time interval is a common multiple of the time division multiplexing period and the synchronization sequence length, and the time division multiplexing period of the designated service is 1/n time of the period of a wireless interface connection frame number, n is an integer; and transmitting, by the lower layer network element(s), a synchronization sequence, whose timestamp locates in a current scheduling transmission time interval, in an available transmission period of a designated scheduling transmission time interval.

2. The method according to claim 1, wherein the method further comprises:

obtaining, by the lower layer network element(s), the synchronization sequence length of the upper layer network element in advance.

3. The method according to claim 2, wherein obtaining, by the lower layer network element(s), the synchronization sequence length of the upper layer network element in advance comprises:

obtaining, by the lower layer network element(s), the synchronization sequence length according to a system configuration; and notifying, by the upper layer network element, the lower layer network element(s) of the synchronization sequence length.

4. The method according to claim 3, wherein the designated scheduling transmission time interval comprises one of the current scheduling transmission time interval and the next scheduling transmission time interval.

5. The method according to claim 3, wherein after obtaining, by the lower layer network element(s), the multiple synchronization sequences of the designated service, the method further comprises:

for synchronization sequence(s) whose timestamp locates in the synchronization sequence length of the current scheduling transmission time interval, performing, by the lower layer network element(s), an RLC concatenation processing on the multiple data packets comprised in the synchronization sequence(s).

6. The method according to claim 3, wherein processing, by the upper layer network element, the data packets of the designated service according to the synchronization sequence length comprises:

marking, by the upper layer network element, the data packets of the designated service with timestamp information according to the synchronization sequence length.

7. The method according to claim 2, wherein the designated scheduling transmission time interval comprises one of the current scheduling transmission time interval and the next scheduling transmission time interval.

8. The method according to claim 2, wherein after obtaining, by the lower layer network element(s), the multiple synchronization sequences of the designated service, the method further comprises:

for synchronization sequence(s) whose timestamp locates in the synchronization sequence length of the current scheduling transmission time interval, performing, by the lower layer network element(s), an RLC concatenation processing on the multiple data packets comprised in the synchronization sequence(s).

9. The method according to claim 2, wherein processing, by the upper layer network element, the data packets of the designated service according to the synchronization sequence length comprises:

marking, by the upper layer network element, the data packets of the designated service with timestamp information according to the synchronization sequence length.

10. The method according to claim 1, wherein the method further comprises:

determining the timestamp information corresponding to a first synchronization sequence obtained by the lower layer network element(s) as a start time of the first scheduling transmission time interval.

11. The method according to claim 10, wherein the designated scheduling transmission time interval comprises one of the current scheduling transmission time interval and the next scheduling transmission time interval.

12. The method according to claim 10, wherein after obtaining, by the lower layer network element(s), the multiple synchronization sequences of the designated service, the method further comprises:

for synchronization sequence(s) whose timestamp locates in the synchronization sequence length of the current scheduling transmission time interval, performing, by the lower layer network element(s), an RLC concatenation processing on the multiple data packets comprised in the synchronization sequence(s).

13. The method according to claim 1, wherein the designated scheduling transmission time interval comprises one of the current scheduling transmission time interval and the next scheduling transmission time interval.

14. The method according to claim 1, wherein after obtaining, by the lower layer network element(s), the multiple synchronization sequences of the designated service, the method further comprises:

for synchronization sequence(s) whose timestamp locates in the synchronization sequence length of the current scheduling transmission time interval, the lower layer network element(s) performing, by the lower layer network element(s), an RLC concatenation processing on the multiple data packets comprised in the synchronization sequence(s).

15. The method according to claim 1, wherein the method further comprises:

when receiving the first data packet of the first synchronization sequence within each scheduling transmission time interval, resetting, by the lower layer network element(s), an RLC sequence number of the designated service.

16. The method according to claim 1, wherein the available transmission period is a period of time of the wireless interface resources which is used for transmitting the data packets.

17. The method according to claim 1, wherein the data packets in the synchronization sequence(s) also carry the accumulated data length and the sequence number of the data packets.

18. The method according to claim 1, wherein processing, by the upper layer network element, the data packets of the designated service according to the synchronization sequence length comprises:

marking, by the upper layer network element, the data packets of the designated service with timestamp information according to the synchronization sequence length.

19. The method according to claim 1, wherein the synchronization sequence length is a scheduling period.

20. An apparatus for synchronization scheduling, located at a lower layer network element side, the apparatus comprising:
- obtaining means, configured to obtain multiple synchronization sequences of a designated service from an upper layer network element to which a lower layer network element belongs, wherein the upper layer network element processes data packets of the designated service according to a synchronization sequence length, and transmits the multiple synchronization sequences to the lower layer network element, wherein each synchronization sequence is a set of data packets with the same timestamp information;
- determining means, configured to determine a scheduling transmission time interval according to the synchronization sequence length and a time division multiplexing period of the designated service, wherein the scheduling transmission time interval is a common multiple of the time division multiplexing period and the synchronization sequence length, and the time division multiplexing period of the designated service is 1/n time of the period of a wireless interface connection frame number, n is an integer; and
- transmitting means, configured to transmit a synchronization sequence whose timestamp locates in a current scheduling transmission time interval in an available transmission period of the time division multiplexing period of a designated scheduling transmission time interval, wherein the designated scheduling transmission time interval comprises one of the current scheduling transmission time interval and the next scheduling transmission time interval.

* * * * *

UNITED STATES PATENT AND TRADEMARK OFFICE
CERTIFICATE OF CORRECTION

| | | |
|---|---|---|
| PATENT NO. | : 8,654,757 B2 | |
| APPLICATION NO. | : 13/128918 | |
| DATED | : February 18, 2014 | |
| INVENTOR(S) | : Jianxun Ai et al. | |

It is certified that error appears in the above-identified patent and that said Letters Patent is hereby corrected as shown below:

On the Title Page, Item (54), and in the Specification, Column 1, line 1 should read:

-- Method and Apparatus for Synchronization Scheduling --.

Signed and Sealed this
Eighteenth Day of November, 2014

Michelle K. Lee
*Deputy Director of the United States Patent and Trademark Office*